J. S. JUAREZ.
SPEED CHANGE DEVICE.
APPLICATION FILED AUG. 9, 1915.
1,198,451.
Patented Sept. 19, 1916.
2 SHEETS—SHEET 2.
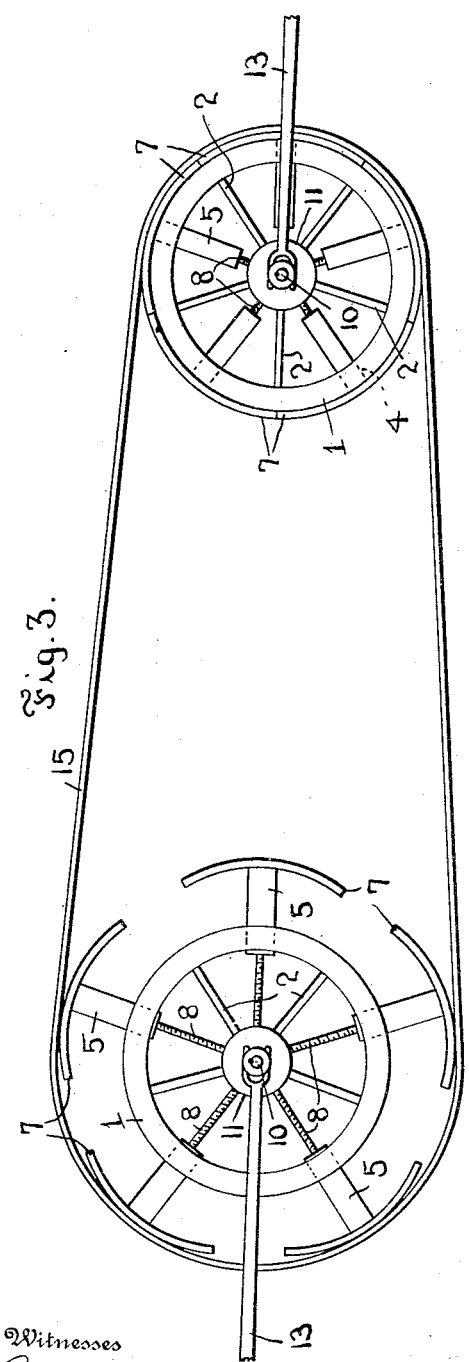
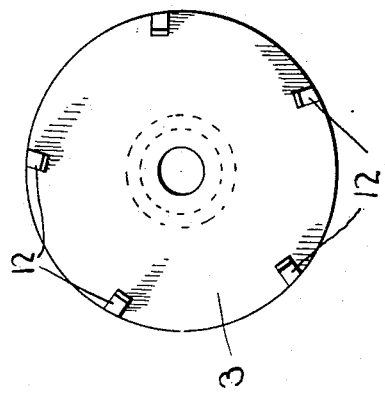
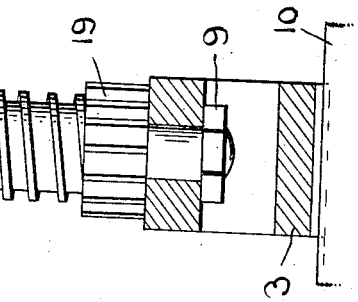
Witnesses
L. B. James
P. H. Pattison
Inventor
José Sanchez Juarez
By Mansell F. Mills
Attorney

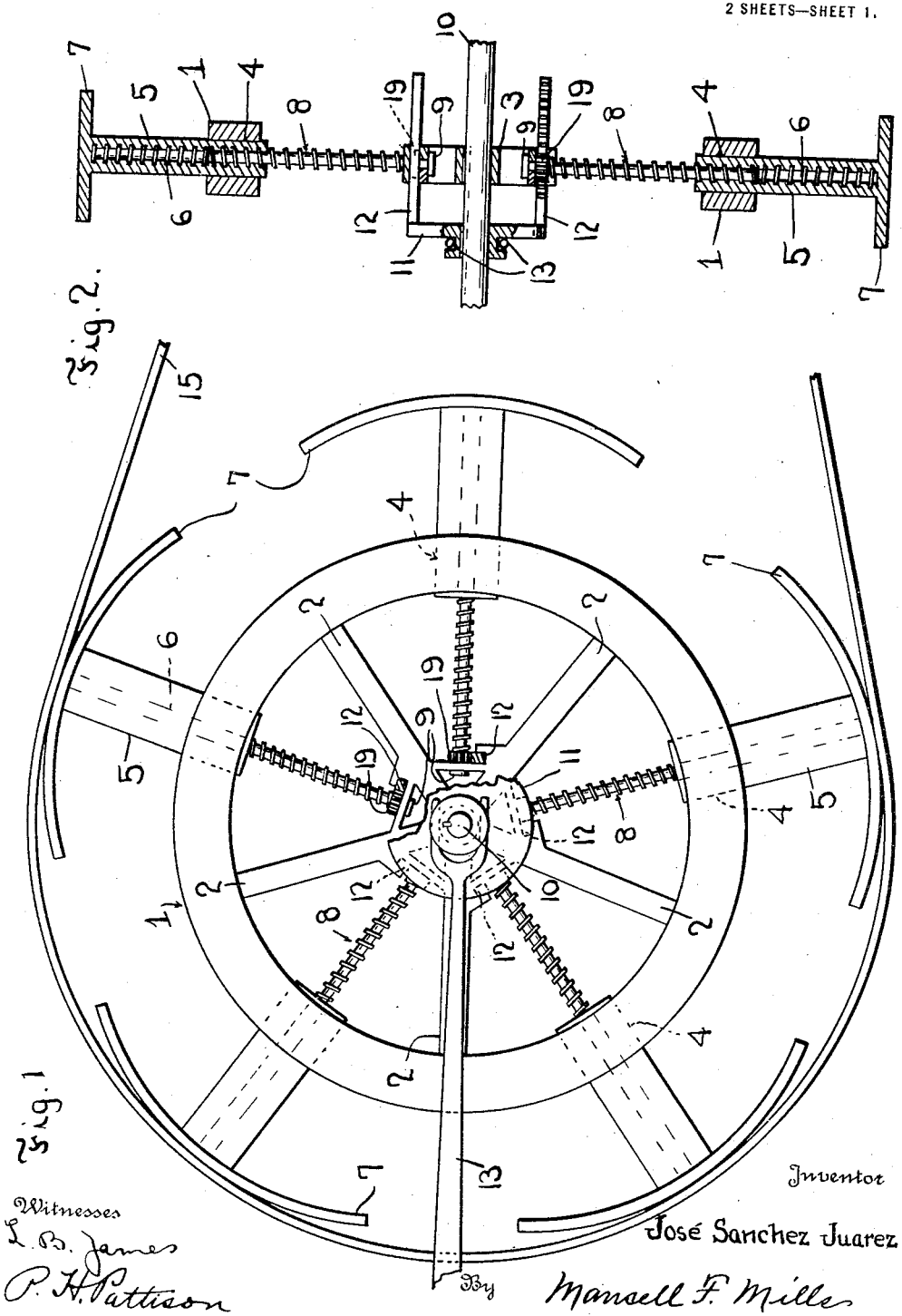

UNITED STATES PATENT OFFICE.

JOSÉ SANCHEZ JUAREZ, OF MEXICO, MEXICO.

SPEED-CHANGE DEVICE.

1,198,451.  Specification of Letters Patent.  Patented Sept. 19, 1916.

Application filed August 9, 1915. Serial No. 44,522.

*To all whom it may concern:*

Be it known that I, JOSÉ SANCHEZ JUAREZ, a citizen of the Republic of Mexico, residing at Mexico city, in the Federal District and State of Mexico, have invented certain new and useful Improvements in Speed-Change Devices, of which the following is a specification.

This invention relates to new and useful improvements in expansible pulleys and has for its primary object to provide a device of this character in which the diameter of the pulley may be increased or decreased at the will of the operator.

Referring to the drawings; Figure 1 is a side elevation of a pulley constructed in accordance with the present invention; Fig. 2 is a vertical sectional view thereof; Fig. 3 is a side elevation of two of the pulleys connected by a driving belt; Fig. 4 is a detail sectional view; and Fig. 5 is a detail elevation.

Referring more particularly to the drawings, the reference character 1 designates a wheel, 2 the spokes thereof, and 3 the hub portion. The rim of the wheel is provided midway between the spokes with openings 4, and slidably mounted in said openings are hollow rectangular members 5 the interior of said hollow rectangular members 5 being provided with a screw-thread 6. Mounted on the outer end of each of the rectangular members 5 is an arcuate member 7 the purpose of which will be hereinafter described.

Projecting radially from the hub portion 3 are screw-threaded members 8, the inner end of each of which is screw-threaded and engaging said screw-threads is a nut 9 which forms the means by which the screw-threaded members 8 are retained in the hub, and carried by the inner end of each of the screw-threaded members 8 is a gear 19.

As shown in Fig. 1 there are five of the sliding rectangular members 5 and five screw-threaded members 8, and slidably mounted on the shaft 10 is a yoke or the like 11 which comprises rack members 12 there being one rack member 12 for each of the screw-threaded members 8. A clutch lever 13 is adapted to engage the yoke 11 to slide the same along the shaft 10, and upon movement of the yoke member along the shaft, the racks 12 owing to their engagement with the gears 19 rotate the screw-threaded members 8 and owing to their screw-threaded engagement with the interior thread of the rectangular blocks 5, said rectangular blocks are moved radially of the wheel 1 to increase or decrease the diameter of the pulley according to the direction of rotation of the screw-threaded members 8.

As shown in Fig. 3 two of these expansible pulleys are connected by means of a driving belt 15, and when it is desired to change the speed of one of the pulleys the screw-threaded members thereof are rotated to move the rectangular blocks 5 inwardly or outwardly to decrease or increase the diameter thereof respectively. When the diameter of one of the pulleys is decreased the diameter of the opposite pulley is correspondingly increased until the slack in the driving belt 15 has been taken up.

What is claimed is:

1. A changeable speed device comprising a hub having openings mounted on a shaft, an annulus having openings spaced from the hub, rim segments having supporting elements operating in the openings of the annulus, a screw-threaded member operating in each rim supporting element to move the same radially of the hub, a gear on one end of each screw-threaded member, a rack for engaging each gear, and means movable longitudinally of the shaft for moving the racks simultaneously.

2. A changeable speed device comprising a pulley having a sectional periphery, a screw-threaded member operating each section of the periphery, a gear wheel on one end of each screw-threaded member, a rack engaging each gear wheel, and a yoke engaging the racks whereby movement of the yoke communicates rotary movement to the gear wheels simultaneously, through the racks.

In testimony whereof I affix my signature in presence of a witness.

JOSÉ SANCHEZ JUAREZ.

Witness:
  ALONSO MARISCAL Y PEÑA.

Copies of this patent may be obtained for five cents each, by addressing the "Commissioner of Patents, Washington, D. C."